May 5, 1931.  A. L. HOWARD  1,804,218
BUMPER BOOT
Filed Sept. 9, 1930  2 Sheets-Sheet 1
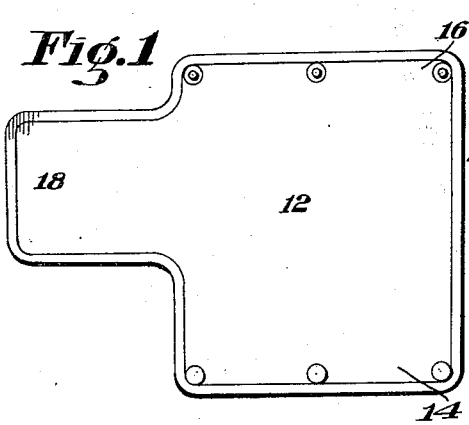
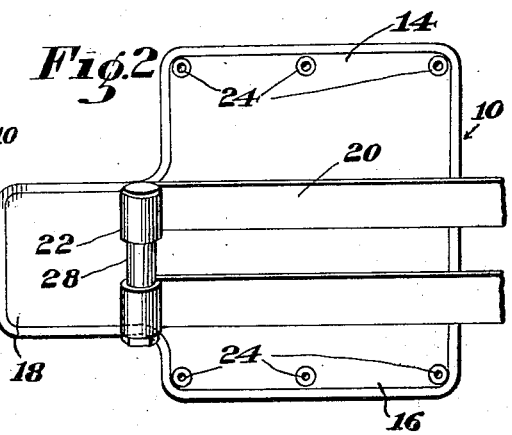
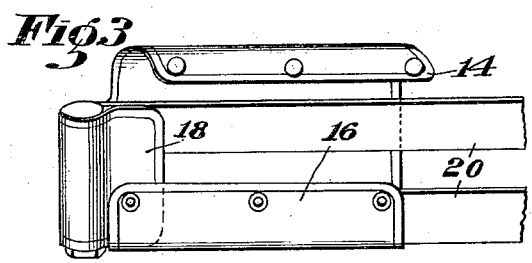
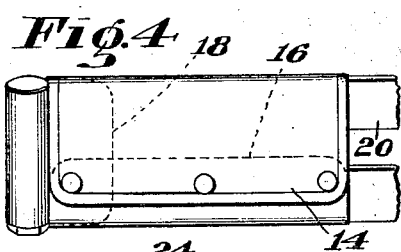
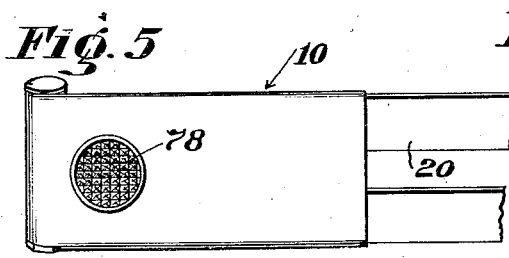
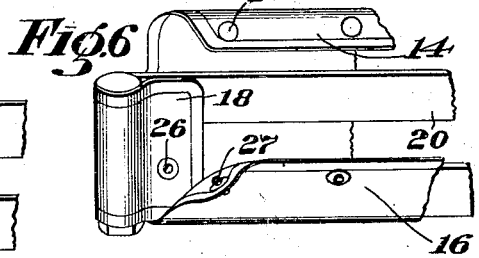
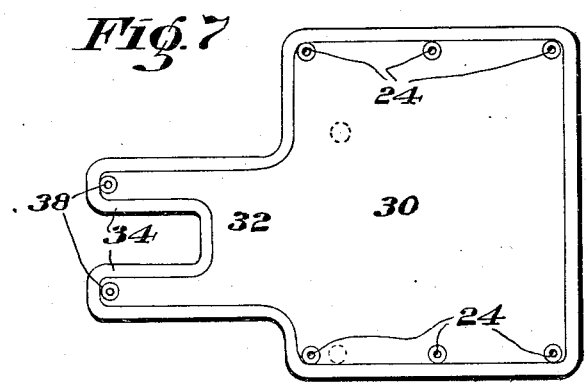
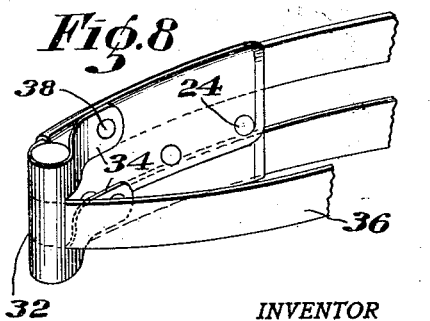
INVENTOR
Albert L. Howard
BY
ATTORNEY May 5, 1931. A. L. HOWARD 1,804,218
BUMPER BOOT
Filed Sept. 9, 1930    2 Sheets-Sheet 2
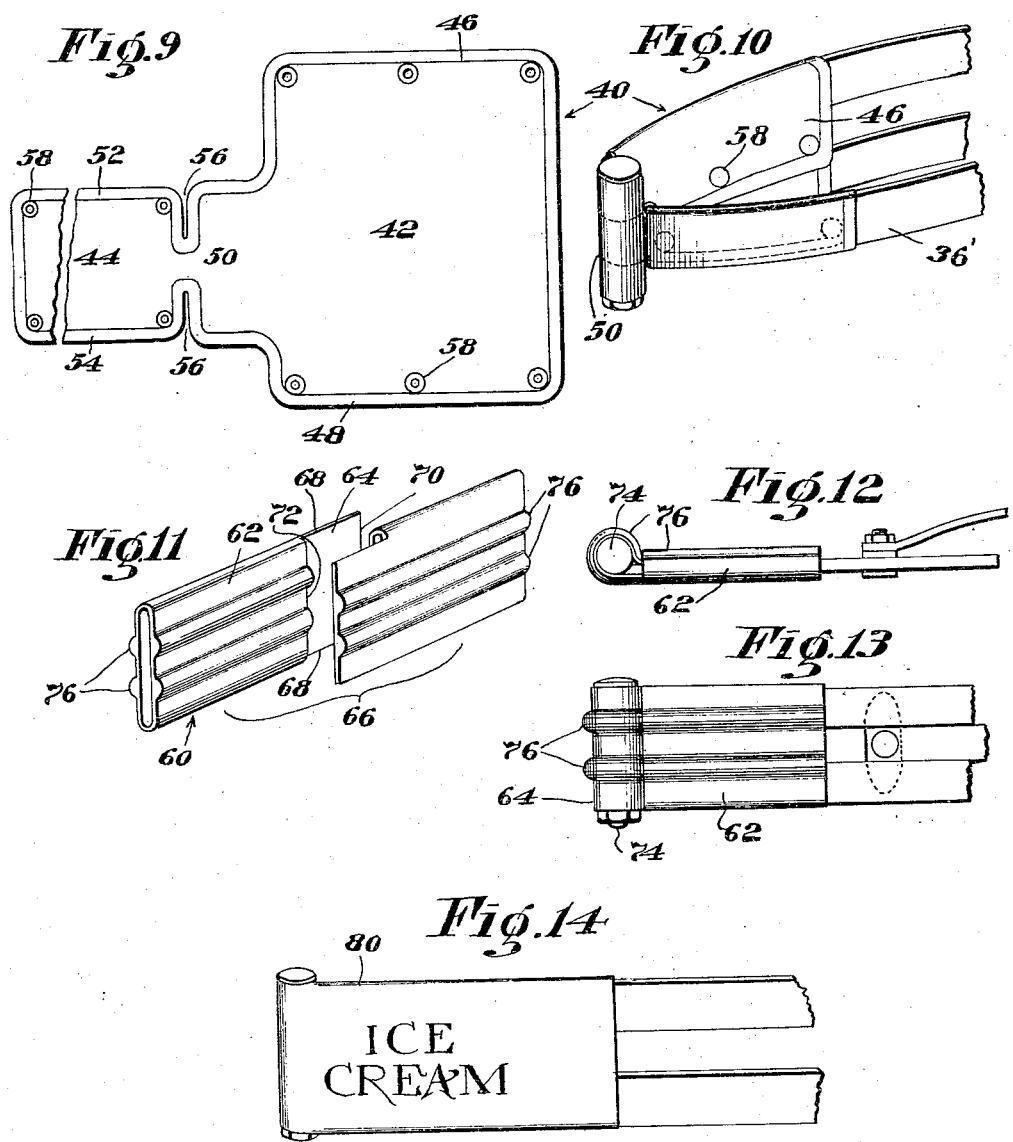
INVENTOR
BY Albert L. Howard
ATTORNEY Patented May 5, 1931

1,804,218

UNITED STATES PATENT OFFICE.

ALBERT L. HOWARD, OF BROCKTON, MASSACHUSETTS, ASSIGNOR TO HAMILTON-WADE COMPANY, OF BROCKTON, MASSACHUSETTS, A CORPORATION OF MASSACHUSETTS

BUMPER BOOT

Application filed September 9, 1930. Serial No. 480,641.

This invention relates to bumper boots for covering and protecting the end portions of automobile bumpers. These end portions, being located in line with the wheels and at the extreme side edges of the vehicle, become soiled more quickly and are more likely to engage and damage other cars and objects than is the intermediate portion of the bumper. The collection of tar, grease, mud, and other like materials on the bumper is particularly objectionable and such collection takes place very rapidly on the present-day roads. It is an object of my invention to provide an improved bumper boot which will not only cover and protect from this objectionable collection that portion of the bumper which is in line with the wheels but which will also cover and protect the extreme end portions of the bumper in a manner preventing the scratching and marring of the bumper and objects engaged thereby.

My improved boot comprises a body portion for covering and protecting the end portion of the bumper in line with a wheel and a flap portion for folding around and protecting the extreme end of the bumper. I am aware that bumpers of many designs are now in common use but a review of these bumpers has disclosed the fact that most of them have such features in common that my improved boot, with some slight modifications, all within the scope of my invention, may be made to fit substantially all of these bumpers. It is, therefore, another object of my invention to provide an improved bumper boot of this nature and for the purpose stated.

My improved boot may be made in a flat piece adapted to be folded over the bumper or in tubular form adapted to be drawn over the bumper ends. The bumper end protecting flap may be held in place about such end by any convenient means acting either frictionally or positively, as may also any other flaps provided on the boot. The exposed face of the boot may also be provided with advertising matter, light reflectors, or other devices or attachments for any purpose desired.

The boot of my invention may be constructed in tubular form by slitting a tubular member into two parts, each constituting a boot, and if desired this member and boots made therefrom may have shock-absorbing cushion ribs therein or therealong for providing a further protection to the bumper or any object engaged thereby. An improved bumper boot characterized by a ribbed body or flap or both constitutes an important feature of my invention.

In the accompanying drawings I have illustrated certain specific embodiments of my invention but it will be understood that the invention can be otherwise embodied and that the drawings are not to be construed as defining or limiting the scope of the invention, the claims appended hereto being relied upon for that purpose.

Referring to the figures of the drawings,

Fig. 1 is a front view of a bumper boot illustrating one form of my invention;

Fig. 2 is a rear view of the boot illustrating the application thereof to a bumper;

Fig. 3 is a similar view showing the flaps partially folded over the bumper;

Fig. 4 is a similar view showing the boot fully secured to the bumper;

Fig. 5 is a view in front elevation showing the boot provided with a light reflector;

Fig. 6 is a view similar to Fig. 3 but showing fastening means for the end flap;

Fig. 7 illustrates a bumper boot like that shown in Fig. 2 but slightly modified to adapt it for use on a bumper having a rear bumper bar;

Fig. 8 shows the application thereof to a bumper;

Fig. 9 illustrates a further modified form of this boot;

Fig. 10 shows the application thereof to a bumper;

Fig. 11 illustrates my bumper boot in tubular form and a method of producing the same;

Figs. 12 and 13 show the application thereof to a bumper; and

Fig. 14 is a front view of one of my bumper boots and shows how advertising may be applied thereto.

One form of my invention is illustrated in

Figs. 1 to 6 of the accompanying drawings. This bumper boot 10 comprises a flat piece of suitable material having a body portion 12, a top flap 14, a bottom flap 16 and an end flap 18. The material should be waterproof and weatherproof at least on its exterior face and should be sufficiently flexible to be folded onto the bumper, as shown in the drawings. I have constructed these boots of fabric which has been treated on its outer face to render the same water-proof and boots thus constructed have proven very tight and substantial for the purpose. The boot is applied to the end portion of a bumper 20 in the manner shown in Figs. 2 and 3. The rear face of the body portion 12 is placed over the front of the bumper and the end flap 18 folded or wrapped about the end 22 of the bumper, as shown in Fig. 3. The bottom flap 16 is then folded over the bottom edge of the bumper and over the end flap, as shown in Fig. 3, and the top flap 14 is thereafter folded over the top edge of the bumper and over the end flap and bottom flap, as shown in Fig. 4. Some means should be provided for securing the top and bottom flaps in place and I have herein illustrated snap fasteners 24 for this purpose. It is believed that the end flap 18 will normally be sufficiently retained frictionally by means of its location between the flaps 14 and 16 and the bumper. The end flap may, however, if desired, be provided with any suitable securing means and I have illustrated the snap fasteners 26 and 27 as performing this function in Fig. 6. The fastener 26 is a socket and the fastener 27 is double headed so as to engage both the socket 26 carried by the end flap and the socket 24 carried by the top flap.

It will be observed that this boot is of simple construction, of ornamental appearance and very efficient in service. The front of the bumper is completely enclosed, as shown in Fig. 5, and the rear thereof is very closely housed by the engagement of the top flap 14 over the bottom flap 16. The end flap 18 not only protects the end of the bumper from the elements and foreign material but also serves the purpose of a protecting and shock-absorbing cushion to prevent injury to the bumper end and to any object engaged thereby. The boot may, furthermore, be very easily removed, cleaned and replaced.

The bumper shown in Figs. 2 to 6 and above described comprises a pair of bumper bars provided with eyes at their ends, the eyes being secured together by a vertical bolt 28 passing therethrough. This type of bumper is very common, as is also the type having a pair of front bars and a rear bar, the ends of these bars being connected by a like vertical bolt. By slightly modifying the boot last above described, it is readily adapted to this latter type of bumper. One such modification is shown in Figs. 7 and 8 of the drawings.

This boot 30 is substantially the same as the boot 10 except that the end flap 32 thereof is bifurcated to provide two subflaps 34. The body portion of this boot and the top and bottom flaps are applied to the bumper in the manner above described in reference to the boot 10. The bifurcated end flap, however, is straddled over the rear bumper bar 36 and held secured in that position. Any suitable fastening means, such as snap fasteners 38, may be provided for this purpose. The function and appearance of this boot are very similar to that of the boot 10 above described.

While the boot 30 encloses and protects the front bumper bars and the bumper ends, it will be observed that it does not protect the rear bumper bar 36. However, by another slight modification the boot 10 may be made to also enclose and protect the rear bar in the same manner as it does the front bars. Such a modification is illustrated in Figs. 9 and 10. This boot 40 has a body portion 42 and a smaller but like body portion 44. The larger body portion 42 has top and bottom flaps 46 and 48 and an end flap 50. The smaller body portion 44 is connected to the end flap 50 and provided with top and bottom flaps 52 and 54, these flaps being separated from the end flap by slits 56. Fasteners 58 may be provided on the top and bottom flaps.

The application of this boot to the bumper is shown in Fig. 10. The main body portion 42 is applied to the front face of the bumper and the bottom and top flaps secured together in overlapping relation, as shown in Fig. 10. The end flap 50 is then carried around the end of the bumper and the smaller body portion 44 applied to the rear bar 36¹ by folding and securing the flaps 52 and 54 thereover in the manner described in reference to the portion 42. As thus applied, the front bumper bars, the rear bumper bar, and the connected ends thereof are all fully housed and protected.

It may be desirable in some cases to make my improved bumper boot in tubular form and in Figs. 11, 12 and 13 I have illustrated such a construction. A boot 60 of this form comprises a tubular body portion 62 having an end flap 64 extending from the end of one side portion thereof. A convenient and economical method of constructing these tubular boots is illustrated in Fig. 11. A tubular piece 66 of suitable material is longitudinally slit intermediate its ends at two opposite portions 68. The piece is then cut into two pieces by severing one side thereof on a line 70 extending between two of the adjacent ends of the two slits 68 and severing the other side on a line 72 extending between the other two ends of the slits. The two pieces thus resulting comprise a pair of bumper boots, i. e., one right-hand and the other left-hand.

The application of this boot to the bumper end is shown in Figs. 12 and 13. The boot is drawn over the end of the bumper in a manner leaving the end flap 64 projecting from the front face of the boot outwardly from the end of the bumper. This end flap is then wrapped about the end 74 of the bumper and tucked into a holding position between the bumper and the rear portion of the boot. It will be observed that this novel boot fully encloses and protects the end portion of the bumper and also provides a protecting cover for the extreme end of the bumper.

As has been heretofore stated, one of the novel and useful functions secured by my invention is a shock-absorbing and protecting cover for the extreme ends of the bumper, it being clear that the function of these ends is to protect the car by engaging any object which might otherwise damage the car. This engagement by the bumper ends frequently scratches and damages other cars and objects and in order to provide further protection in this respect I prefer to construct my bumper boot with a cushioning element or elements, particularly at the bumper end covering portion. This cushioning element or elements may comprise one or more ribs and these ribs may extend throughout the length of the boot. I have preferred thus to illustrate the same in Figs. 11, 12 and 13. Relative to the boot 60, these ribs 76 are formed on both sides of the tubular member 66 so that such ribs are provided on both the front and rear faces of each boot. When the end flap 64 is wrapped about the bumper end, these ribs provide a very effective shock-absorbing and protecting cushion, as will be understood. It will be clear that the tubular form of my invention, including the ribs 76, may be conveniently made by an extruding process.

The function and advantages of my invention are believed to be apparent. The boot in all of its various forms fully protects the end portion of the bumper and eliminates much damage which might otherwise result from contacts against its ends. The boot can, however, be used for additional purposes, as, for example, to provide a degree of safety by the application of reflector lights 78 thereto, as shown in Fig. 5, or to display advertising matter, as shown at 80 in Fig. 14. These advantages and others resulting from the use of the improved boot herein disclosed are contemplated by my invention.

Having thus described my invention, what I claim as new and desire to secure by Letters Patent is:

1. A boot for protecting the end portions of automobile bumpers, comprising a non-rigid body portion for enclosing the end portion of a bumper and an attached and flexible flap portion adapted to fold around and protect the end of the bumper.

2. A boot for protecting the end portions of automobile bumpers, comprising a body portion for enclosing the end portion of a bumper and an attached flap portion adapted to fold around and protect the end of the bumper, the flap being of such length that its free end may extend inwardly of the bumper after passing around the said end thereof and serve to secure the flap in place.

3. A boot for protecting the end portions of automobile bumpers, comprising a body portion for enclosing the end portion of a bumper and an attached flap portion adapted to fold around and protect the end of the bumper, and means for securing the flap in its said folded position.

4. A boot for protecting the end portions of automobile bumpers, comprising a body portion for enclosing the end portion of a bumper and an attached flap portion adapted to fold around and protect the end of the bumper, the free end of the flap portion being held in said folded position by the said body portion.

5. A boot for protecting the end portions of automobile bumpers, comprising a body portion for covering the front side of the bumper, top and bottom flaps for folding about the top and bottom edges of the bumper and covering the back thereof, and an end flap for folding around and protecting the end of the bumper.

6. A boot for protecting the end portions of automobile bumpers, comprsing a body portion for covering the front side of the bumper, top and bottom flaps for folding about the top and bottom edges of the bumper and covering the back thereof, an end flap for folding around and protecting the end of the bumper, and means for securing the said top and bottom flaps together at the rear side of the bumper.

7. A boot for protecting the end portions of automobile bumpers, comprising a body portion for covering the front side of the bumper, top and bottom flaps for folding about the top and bottom edges of the bumper and covering the back thereof, an end flap for folding around and protecting the end of the bumper, and means for securing the said top and bottom flaps in overlapped relation at the rear side of the bumper.

8. A boot for protecting the end portions of automobile bumpers, comprising a body portion for covering the front side of the bumper, top and bottom flaps for folding about the top and bottom edges of the bumper and covering the back thereof, and an end flap for folding around and protecting the end of the bumper, the end flap being of a length to extend inwardly and be held securely between the bumper and the top and bottom flaps.

9. A boot for protecting the end portions of automobile bumpers, comprising a body portion for covering the front side of the bumper, top and bottom flaps for folding about the top and bottom edges of the bumper and covering the back thereof, an end flap for folding around and protecting the end of the bumper, and means for securing the said top and bottom flaps together at the rear side of the bumper and the end flap in its said folded position.

10. A boot for protecting the end portions of automobile bumpers which have front bars and a rear bar, comprising a body portion for covering the front bars, top and bottom flaps for folding about the top and bottom of the front bars and covering the back thereof, an end flap for folding around and protecting the end of the bumper, the end flap having top and bottom portions thereof constructed to extend respectively over the top and beneath the bottom of the said rear bar, and means for holding said top and bottom portions in place.

11. A boot for protecting the end portions of automobile bumpers which have front bars and a rear bar, comprising a body portion for covering the front bars, a body portion for covering the rear bar, and a connecting portion adapted to pass around and protect the end of the bumper at the junction of said front and rear bars.

12. A boot for protecting the end portions of automobile bumpers which have front bars and a rear bar, comprising a body portion for covering the front bars, a body portion for covering the rear bar, a connecting portion adapted to pass around and protect the end of the bumper at the junction of said front and rear bars, each of said body portions having top and bottom flaps for covering the rear of their bars, and means for holding the flaps in place.

13. A boot for protecting the end portions of automobile bumpers, comprising a tubular body portion to be pulled over the end of a bumper, and a flap at one end adapted to fold around and protect the end of the bumper and to be secured by engagement between the bumper and boot.

14. A boot for protecting the end portions of automobile bumpers, comprising a tubular body portion to be pulled over the end of a bumper, and a flap at one end adapted to fold around and protect the end of the bumper and to be secured by engagement between the bumper and boot, the flap having one or more resilient portions thereon to provide a bumper cushion at the end of the bumper.

15. A boot for protecting the end portions of automobile bumpers, comprising a tubular body portion to be pulled over the end of a bumper, and a flap at one end adapted to fold around and protect the end of the bumper and to be secured by engagement between the bumper and boot, the flap being secured to the front side of the boot and having one or more resilient ribs extending therealong and along said front side of the boot.

16. The method of forming tubular boots for protecting the end portions of automobile bumpers, consisting of longitudinally slitting two opposite portions of a flexible tubular member intermediate its ends, and cutting said member into two pieces by severing one side thereof on a line extending between two of the adjacent ends of the two slits and severing the other side on a line extending between the other two ends of the slits.

17. A boot for protecting the end portions of automobile bumpers, comprising a body portion for enclosing the end portion of a bumper, an attached flap portion adapted to fold around and protect the end of the bumper, and a shock-absorbing and cushioning means carried by the end flap in position to protect the end of the bumper.

ALBERT L. HOWARD.